US012642254B1

(12) United States Patent
Goodman et al.

(10) Patent No.: US 12,642,254 B1
(45) Date of Patent: Jun. 2, 2026

(54) MOBILE BIRD BATH SPRINKLER SYSTEM

(71) Applicant: Karogen LLC, Delray Beach, FL (US)

(72) Inventors: Kathy E. Goodman, Delray Beach, FL
(US); Robert Sunstone, North Palm
Beach, FL (US)

(73) Assignee: KAROGEN LLC, Delray Beach, FL
(US)

( * ) Notice: Subject to any disclaimer, the term of this
patent is extended or adjusted under 35
U.S.C. 154(b) by 0 days.

(21) Appl. No.: 19/381,025

(22) Filed: Nov. 6, 2025

Related U.S. Application Data

(60) Provisional application No. 63/720,822, filed on Nov.
15, 2024.

(51) Int. Cl.
| | |
|---|---|
| *A01K 45/00* | (2006.01) |
| *A01G 25/09* | (2006.01) |
| *B05B 15/622* | (2018.01) |

(52) U.S. Cl.
CPC ............ *A01K 45/002* (2013.01); *A01G 25/09*
(2013.01); *B05B 15/622* (2018.02)

(58) Field of Classification Search
CPC .......... A01K 45/002; A45F 19/04; E03C 1/32
USPC ............................. D30/123; 119/69.5; 4/488
See application file for complete search history.

(56) References Cited

U.S. PATENT DOCUMENTS

| | | | | |
|---|---|---|---|---|
| 2,878,781 | A * | 3/1959 | Wingfield | ............ A01K 45/002 |
| | | | | 119/72 |
| 6,684,813 | B1 * | 2/2004 | Lemon | ................. A01K 45/002 |
| | | | | 119/69.5 |
| 2006/0037545 | A1 * | 2/2006 | Bradley | ............... A01K 45/002 |
| | | | | 119/69.5 |
| 2014/0116345 | A1 * | 5/2014 | Huber | ................. A01K 45/002 |
| | | | | 119/69.5 |
| 2018/0328555 | A1 * | 11/2018 | Wang | ................... A01K 45/002 |
| 2021/0307300 | A1 * | 10/2021 | Lauchner | ............. A01K 45/002 |

OTHER PUBLICATIONS

Specstar, Oval Bird Bath with Solar Fountain Pump, Sep. 10, 2024
(Year: 2024).*

* cited by examiner

*Primary Examiner* — Joshua D Huson
*Assistant Examiner* — Alanna K Peterson
(74) *Attorney, Agent, or Firm* — Peter J. Van Bergen

(57) ABSTRACT

A mobile bird bath and sprinkler system includes a bird bath
having a base and a basin coupled to the top of the base. A
roller and a spike are coupled to the bottom of the base. A
sprinkler head attached to at least one of the base and basin
is operable to dispense water that is supplied thereto.

19 Claims, 6 Drawing Sheets

MOBILE BIRD BATH SPRINKLER SYSTEM

Pursuant to 35 U.S.C. § 119, the benefit of priority from provisional application 63/720,822, with a filing date of Nov. 15, 2024, is claimed for this non-provisional application.

FIELD OF THE DISCLOSURE

This disclosure relates generally to mobile water features, and more particularly to a combination bird bath and sprinkler system that may be moved easily across a yard or other ground region.

BACKGROUND

In-ground irrigation systems are expensive to install, repair, and maintain. An above-ground sprinkler is relatively inexpensive and is easily replaced but is generally only configurable to irrigate a relatively small area, must be repositioned frequently to cover a larger area, and offers no aesthetic value when in use or before/after it is used for irrigation purposes.

SUMMARY

Accordingly, it is an object of the present disclosure to describe methods and systems for above-ground irrigation.

Another object of the present disclosure is to describe methods and systems for above-ground irrigation of relatively large areas.

Still another object of the present disclosure is to describe methods and systems for above-ground irrigation that are easily positioned where needed while also providing a landscape aesthetic when being used or not used for irrigation purposes.

Other objects and advantages of the methods and systems described herein will become more obvious hereinafter in the specification and drawings.

In accordance with methods and systems described herein, a mobile bird bath and sprinkler system includes a bird bath having a base and a basin coupled to the top of the base. A roller and a spike are coupled to the bottom of the base. A sprinkler head is attached to at least one of the base and the basin. The sprinkler head is operable to dispense water that is supplied to the sprinkler head.

BRIEF DESCRIPTION OF THE DRAWINGS

Other objects, features and advantages of the methods and systems described in the present disclosure will become apparent upon reference to the following description of the preferred embodiments and to the drawings, wherein corresponding reference characters indicate corresponding parts throughout the several views of the drawings and wherein.

DETAILED DESCRIPTION

Figure 1:
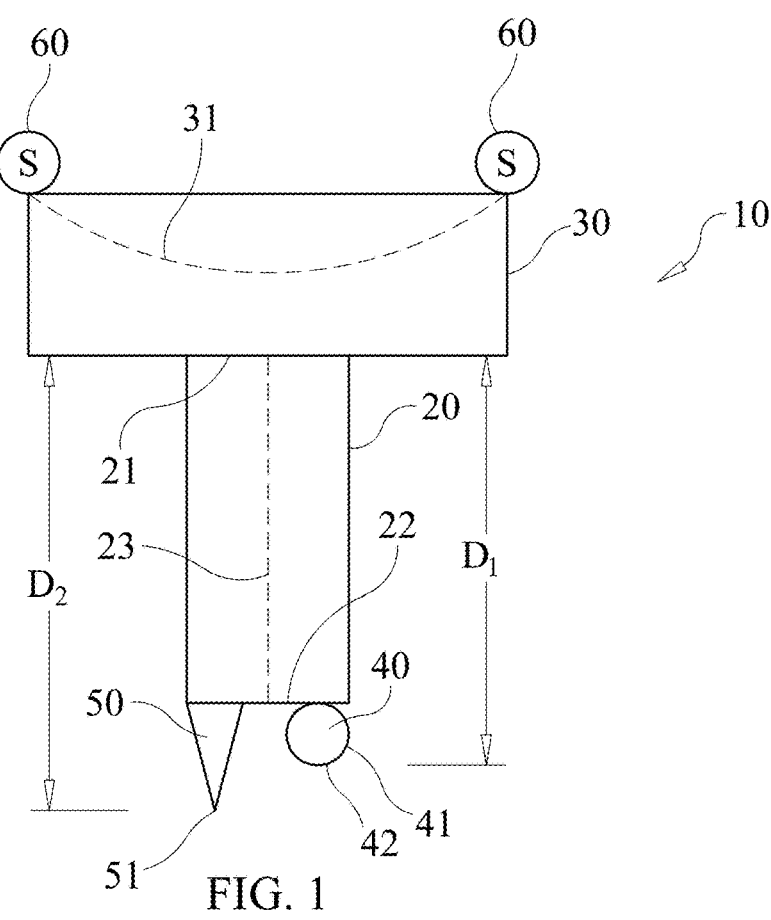
FIG. 1 illustrates a side view of an embodiment of a mobile bird bath and sprinkler system in accordance with various aspects as described herein.

Referring now to the drawings and more particularly to FIG. 1, an embodiment of a mobile bird bath and sprinkler system is shown and is referenced generally by numeral 10. System 10 may be constructed using a variety of weather resistant materials (e.g., plastics, composites, metals, cementitious type materials, etc.), the choice of which is not a limitation of the present disclosure. System 10 will be described herein in terms of its utilitarian features. However, it is to be understood that system 10 may also include a variety of ornamental features without departing from the scope of the present disclosure.

In general, system 10 combines bird bath features and water sprinkler features in a system that is readily moved on a ground surface to a desired location, anchored to the ground, and operable to irrigate an area of the ground. In addition, system 10 provides the landscape aesthetic of a bird bath before, during, and after the system is utilized for irrigation purposes.

The illustrated example depicted in FIG. 1 includes a bird bath having a base 20 and a water basin 30 coupled to base 20 and shaped (for example as indicated at 31) to hold water therein, a roller 40 coupled to base 20, a spike 50 coupled to base 20, and one or more sprinkler heads 60 that are depicted as circles with an "S" therein in the figures. Base 20 and basin 30 may be realized by a variety of shapes and constructions without departing from the scope of the present disclosure. In general, basin 30 is coupled to the top 21 of base 20 where such coupling may be realized by permanent or temporary attachment schemes without departing from the scope of the present disclosure. Similar to conventional bird baths, base 20 has a longitudinal axis indicated by a dashed line referenced by numeral 23. In some embodiments, longitudinal axis 23 is perpendicular to top 21 and bottom 22 of base 20. The shape and size of base 20 are not limitations of the present disclosure.

Roller 40 and spike 50 are coupled to the bottom 22 of base 20. Sprinkler heads 60 may be coupled to base 20 and/or basin 30. In the illustrated embodiment, multiple sprinkler heads 60 are provided and coupled to the periphery of basin 30. For example, sprinkler heads 60 may be distributed about the periphery of basin 30. Each sprinkler head 60 may be realized by any of a variety of well-known sprinkler head designs without departing from the scope of the present disclosure. For example and without limitation, sprinkler head designs may include fixed-direction sprinkler heads, directionally-adjustable sprinkler heads, oscillating sprinkler heads, and pulsating sprinkler heads.

As mentioned above, roller 40 is coupled to the bottom 22 of base 20. It is to be understood that the term "roller" as used herein includes a variety of rotating or rolling structures to include, but not limited to, one or more cylindrical rollers, casters, wheels, and roller balls. The coupling of roller 40 to bottom 22 may be accomplished in a variety of ways without departing from the scope of the present disclosure. Regardless of its type or construction, roller 40 has a perimeter 41 whose location 42 that is furthest from top 21 at any given time is a distance "$D_1$" from top 21 where distance $D_1$ is measured along a line that is parallel to longitudinal axis 23.

Spike 50 is also coupled to the bottom 22 of base 20. It is to be understood that the term "spike" as used herein includes a variety of pointed or knife-edge structures that may be readily pressed into a ground region as will be described further below. Several exemplary but non-limiting spike structures will be described later herein. The coupling of spike 50 to bottom 22 may be accomplished in a variety of ways (e.g., fixed or removable attachment to base 20, integration with base 20, etc.) without departing from the scope of the present disclosure. Regardless of its type or construction, spike 50 has an outboard point or edge 51 that is located a distance "$D_2$" from top 21 where distance $D_2$ is measured along a line that is parallel to longitudinal axis 23. For system 10 and any of the other system embodiments described herein, the distance $D_2$ is greater than the distance $D_1$.

Figure 2:
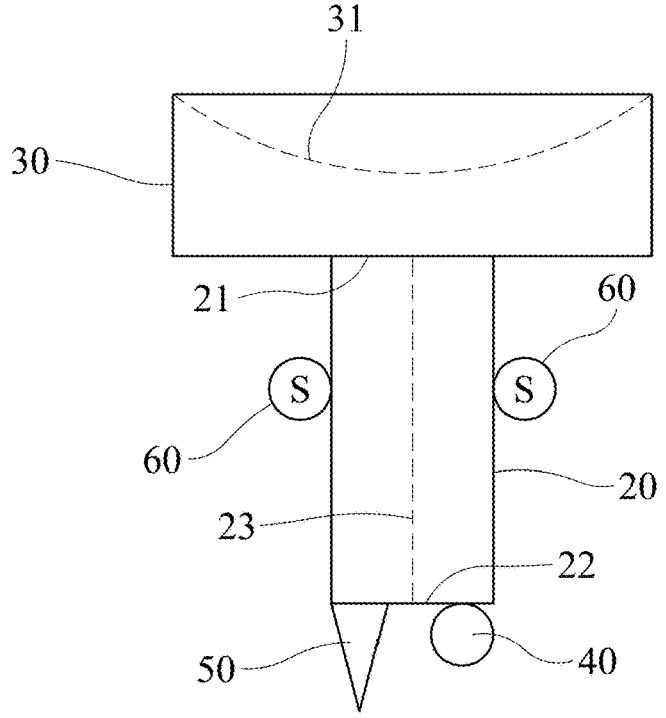
FIG. 2 illustrates a side view of another embodiment of a mobile bird bath and sprinkler system in accordance with various aspects as described herein.
Figure 3:
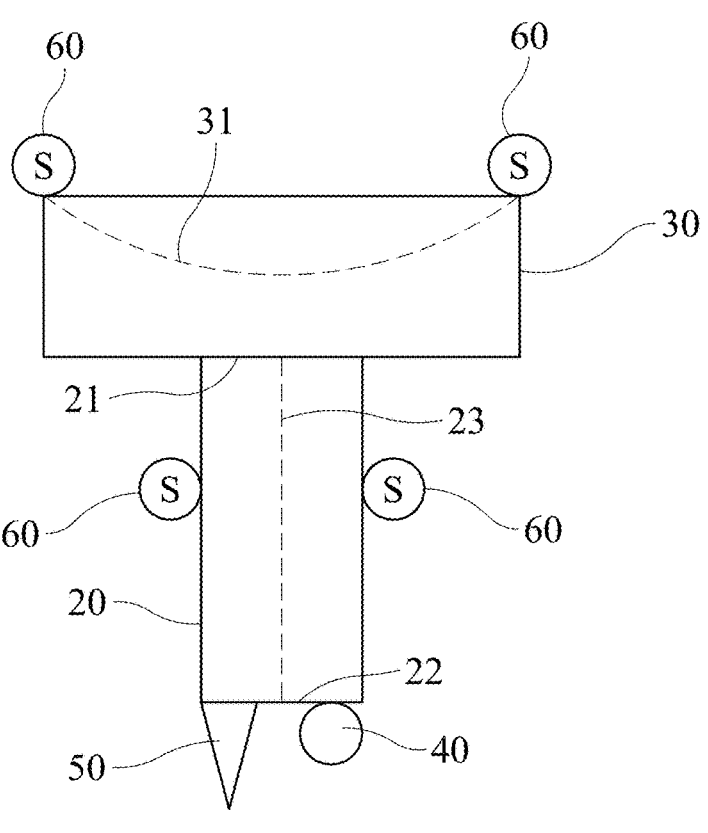
FIG. 3 illustrates a side view of another embodiment of a mobile bird bath and sprinkler system in accordance with various aspects as described herein.

As mentioned above, one or more sprinkler heads may also be coupled to base 20. For example and as illustrated in FIG. 2, sprinkler heads 60 are coupled to base 20. In some embodiments, sprinkler heads 60 may be coupled to base 20 and basin 30 as illustrated in FIG. 3. The positioning of sprinkler heads 60 on base 20 and/or basin 30 is not a limitation of the present disclosure.

Figure 4:
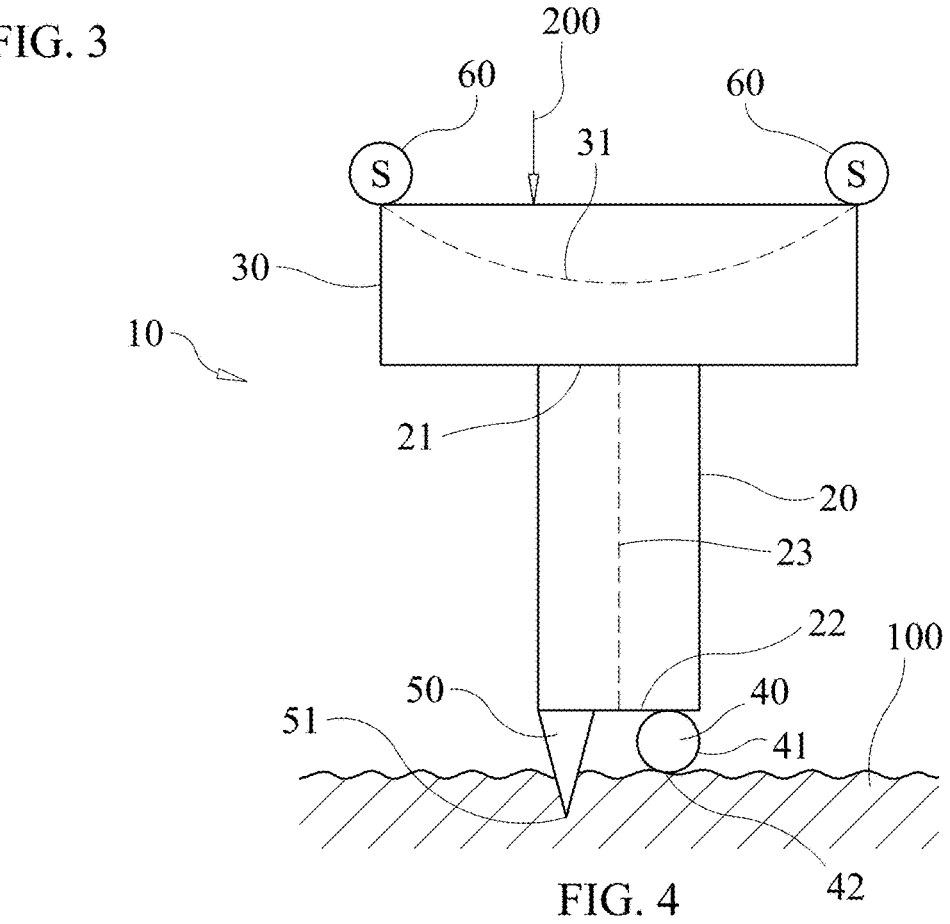
FIG. 4 illustrates a side view of an installation configuration for an embodiment of a mobile bird bath and sprinkler system in accordance with various aspects as described herein.

Referring now to FIG. 4, an installation configuration of a mobile bird bath and sprinkler system at a ground region 100 is illustrated. In the illustrated example, the above-described system 10 is shown. However, it is to be understood that the installation configuration also applies to any of the other system configurations previously described herein or to be described later herein. Prior to being placed in the illustrated installation configuration, system 10 is tilted such that only roller 40 engages the surface 102 of ground region 100. Once system 10 is positioned at a desired locale of ground region 100, the top of basin 30 may be pressed downward as indicated by arrow 200 to thereby drive spike 50 into ground region 100 as the furthest perimeter location 42 of roller 40 rests on the surface 102 of ground region 100 and longitudinal axis 23 is perpendicular to the surface 102. To reposition system 10, one simply tilts system 10 until spike 50 disengages from ground region 100 thereby allowing system 10 to be rolled over the surface 102 via engagement of only roller 40 with the surface 102.

Figure 5:
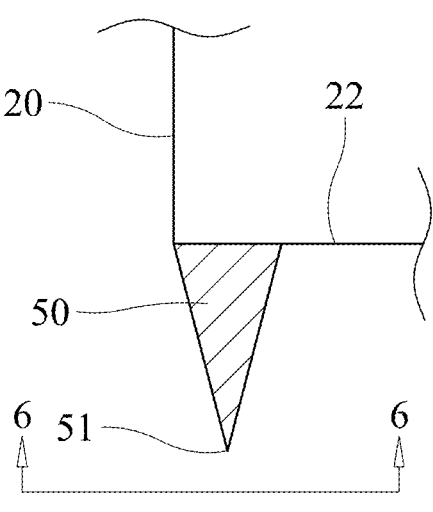
FIG. 5 illustrates an isolated cross-sectional view of a spike located at the bottom of the base of a mobile bird bath and sprinkler system in accordance with various aspects as described herein.
Figure 6A:
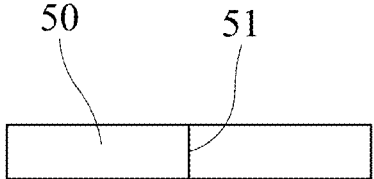
FIG. 6A illustrates an end view of an embodiment of a spike taken along line 6-6 in FIG. 5 in accordance with various aspects as described herein.
Figure 6B:
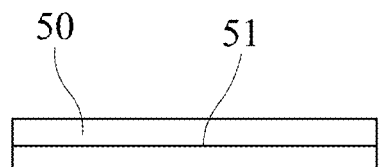
FIG. 6B illustrates an end view of another embodiment of a spike taken along line 6-6 in FIG. 5 in accordance with various aspects as described herein.
Figure 6C:
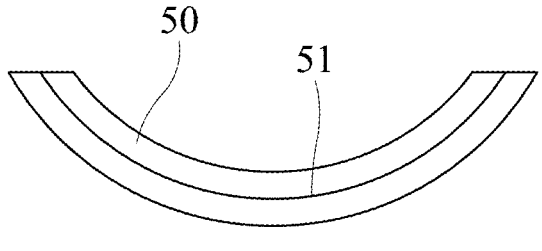
FIG. 6C illustrates an end view of another embodiment of a spike taken along line 6-6 in FIG. 5 in accordance with various aspects as described herein.
Figure 6D:
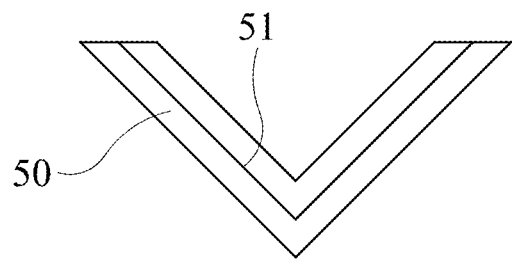
FIG. 6D illustrates an end view of another embodiment of a spike taken along line 6-6 in FIG. 5 in accordance with various aspects as described herein.

Referring now to FIG. 5, an isolated cross-sectional view of a spike 50 is illustrated. Spike 50 may be configured in a variety of ways without departing from the scope of the present disclosure. Several exemplary configurations of spike 50 will be described with the aid of FIGS. 6A-6D where each illustrated view of spike 50 is taken along line 6-6 in FIG. 5. In FIG. 6A, spike 50 is tapered to its outboard edge 51 that may be a point or a knife-like edge. In FIG. 6B, spike 50 is a straight or flat plate whose outboard edge 51 may be a straight or serrated knife edge. In FIG. 6C, spike 50 is a curved plate whose outboard edge 51 may be a knife edge. In FIG. 6C, spike 50 is a V-shaped spike whose outboard edge 51 may be a point or a knife-like edge.

Figure 7:
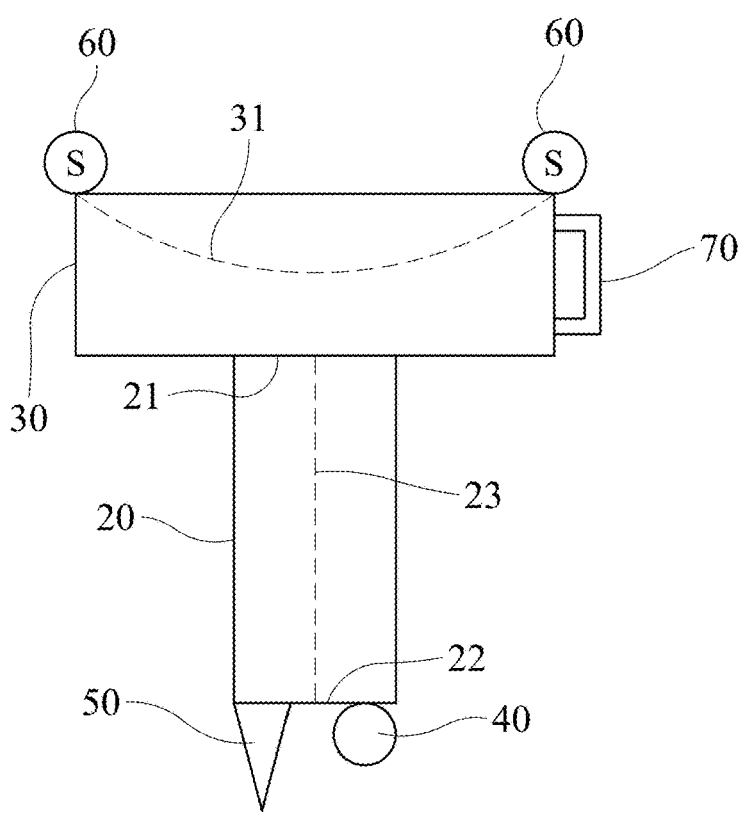
FIG. 7 illustrates a side view of another embodiment of a mobile bird bath and sprinkler system that includes a handle in accordance with various aspects as described herein.

In some embodiments, a handle may be provided to facilitate the maneuvering of a bird bath and sprinkler system as described herein. For example, FIG. 7 illustrates a handle 70 attached to basin 30. In some embodiments, handle 70 is aligned with roller 40 to facilitate the tipping and movement of the system on the surface of a ground region.

Figure 8:
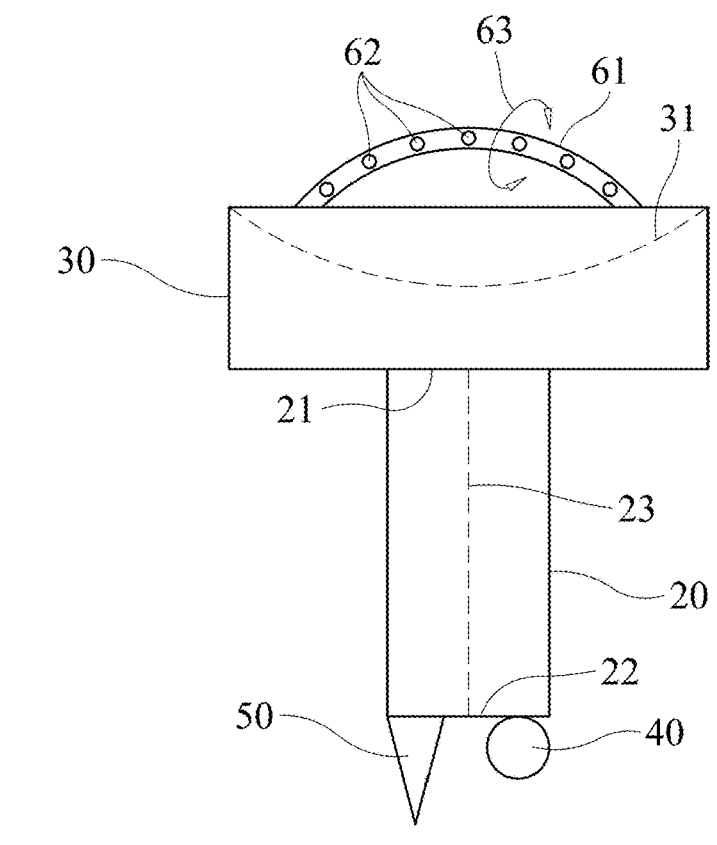
FIG. 8 illustrates a side view of another embodiment of a mobile bird bath and sprinkler system that includes an oscillating sprinkler head in accordance with various aspects as described herein.

As mentioned above, a variety of types of sprinkler heads may be used by a system constructed in accordance with the teachings of the present disclosure. For example, FIG. 8 illustrates an oscillating sprinkler head 61 having multiple water-dispensing holes 62. As is well-understood in the art, oscillating sprinkler head 61 includes a mechanism (not shown) that causes sprinkler head 61 to move through an arc (indicated by two-headed arrow 63) as water flows through the sprinkler head.

Figure 9:
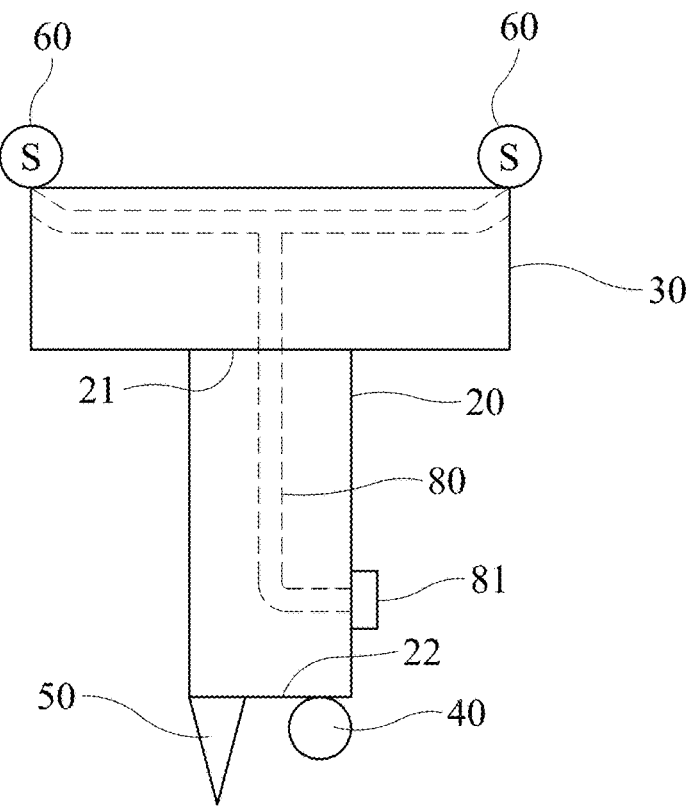
FIG. 9 illustrates a side view of another embodiment of a mobile bird bath and sprinkler system that incorporates a water-carrying conduit in accordance with various aspects as described herein.

In some embodiments, the one or more sprinkler heads may be attached to a garden hose so that a flow of water may be provided to the sprinkler heads for ultimate distribution over a ground region. However, in some embodiments, a system constructed in accordance with the present disclosure may include a conduit (e.g., a flexible hose, PVC tubing, etc.) mounted in and/or on the system and in fluid communication with the system's sprinkler heads. In this way, a single garden hose may be used to supply a flow of water to all the system's sprinkler heads. For example and as illustrated in FIG. 9, a water-carrying conduit 80 is positioned in base 20 and extends around basin 30. Conduit 80 is in fluid communication with each sprinkler head 60. For aesthetics and protection of conduit 80, all conduit 80 may be contained within base 20 and basin 30 as illustrated. Conduit 80 may include a connection port 81 accessible at a lower portion of base 20 to provide for the connection of a garden or other water supply hose (not shown).

Figure 10:
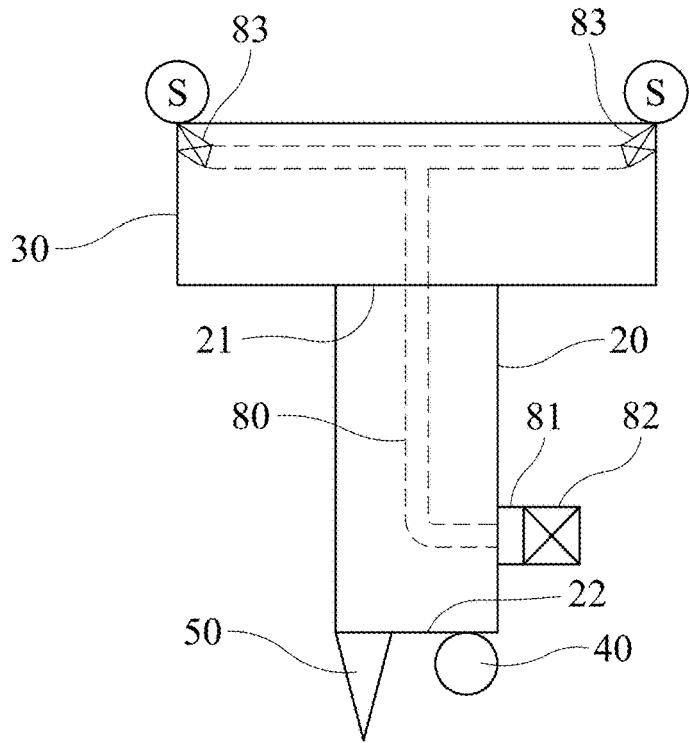
FIG. 10 illustrates a side view of another embodiment of a mobile bird bath and sprinkler system that incorporates a water-carrying conduit and one or more valves to control water flow to the system's sprinkler heads in accordance with various aspects as described herein.

In some embodiments, the above-described conduit 80 may incorporate one or more valves to control the flow of water to the system's various sprinkler heads. For example and as illustrated in FIG. 10, one valve 82 may be provided just before or just after connection port 81 to control a flow of water into conduit 80. Additional valves 83 may be provided with each valve 83 being associated with a particular sprinkler head 60 (as shown) or groups of sprinkler heads thereby allowing a user to customize water distribution locations. Valves 82 and/or 83 may be any of a variety of manually or remotely-controlled valves. The valves may be of the check valve type capable of controlling or limiting the direction of water flow.

5

6

Figure 11:
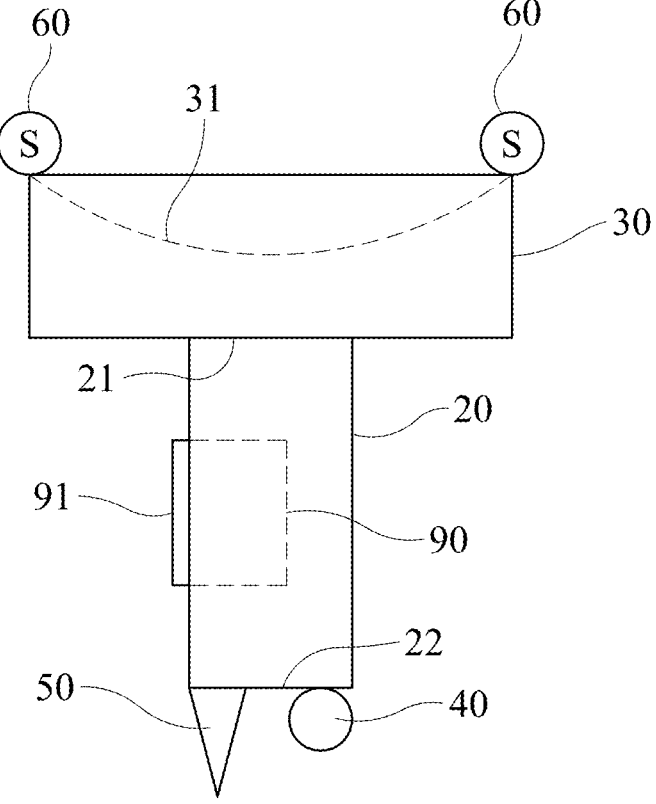
FIG. 11 illustrates a side view of another embodiment of a mobile bird bath and sprinkler system that includes a storage compartment in the system's base in accordance with various aspects as described herein.

In some embodiments, the systems described herein may include additional features. For example, FIG. 11 illustrates a storage compartment 90 in base 20. A door 91 may be provided to allow a user to access and seal compartment 90. Compartment 90 may be used to house accessories such as, but not limited to, a sprinkler control system, solar or low-voltage electrical lighting elements, electrical items to include batteries, cleaning implements for basin 30, and/or a drip irrigation line attachable to, for example, the above-described valve 82 where such drip irrigation line may then be provided where needed on the surface of a ground region.

The advantages of the methods and systems described herein are numerous. The bird bath and sprinkler system is an above-ground irrigation solution that is an inexpensive alternative to an in-ground sprinkler system. The system may be easily maneuvered to a location at a ground region, anchored in place, and then used for irrigation for some or all of area around the system. The bird bath portion of the system provides a landscape aesthetic while the system is used for irrigation as well as when the system is not used for irrigation.

Although the methods and systems presented herein have been described for specific embodiments thereof, there are numerous variations and modifications that will be readily apparent to those skilled in the art in light of the above teachings. For example, features such as lights and/or cameras may be added to the bird bath's basin. It is therefore to be understood that, within the scope of the appended claims, the methods and systems presented herein may be practiced other than as specifically described.

What is claimed as new and desired to be secured by Letters Patent of the United States is:

1. A mobile bird bath and sprinkler system, comprising:
a base having a longitudinal axis, a top at a first end of said longitudinal axis, and a bottom at a second end of said longitudinal axis;
a basin coupled to said top of said base;
a roller coupled to said bottom of said base;
a spike coupled to said bottom of said base wherein, when said longitudinal axis is perpendicular to a ground region, said roller rests on a surface of the ground region and said spike extends into the ground region; and
a sprinkler head attached to at least one of said base and said basin, said sprinkler head operable to distribute water over the ground region.

2. The mobile bird bath and sprinkler system of claim 1, further comprising:
a handle attached to said basin.

3. The mobile bird bath and sprinkler system of claim 1, wherein said sprinkler head comprises an oscillating sprinkler head.

4. The mobile bird bath and sprinkler system of claim 1, further comprising:
a set of directionally-adjustable sprinkler heads distributed about a periphery of said basin.

5. The mobile bird bath and sprinkler system of claim 1, further comprising:
a conduit coupled to said base and said basin, said conduit in fluid communication with said sprinkler head and operable to deliver a flow of water to said sprinkler head.

6. The mobile bird bath and sprinkler system of claim 5, further comprising:
a valve coupled to said conduit and operable to control the flow of water.

7. The mobile bird bath and sprinkler system of claim 1, wherein said base includes a storage compartment.

8. A mobile bird bath and sprinkler system, comprising:
a base having a longitudinal axis, a top at a first end of said longitudinal axis and perpendicular to said longitudinal axis, and a bottom at a second end of said longitudinal axis and perpendicular to said longitudinal axis;
a basin coupled to said top of said base;
a roller coupled to said bottom of said base, said roller having a perimeter;
a spike coupled to said bottom of said base, said spike having an outboard edge, wherein a first distance measured parallel to said longitudinal axis and extending from said top to said outboard edge is greater than a second distance measured parallel to said longitudinal axis and extending from said top to a furthest location on said perimeter; and
a sprinkler head attached to at least one of said base and said basin, said sprinkler head operable to distribute water over the ground region.

9. The mobile bird bath and sprinkler system of claim 8, further comprising:
a handle attached to said basin.

10. The mobile bird bath and sprinkler system of claim 8, wherein said sprinkler head comprises an oscillating sprinkler head.

11. The mobile bird bath and sprinkler system of claim 8, further comprising:
a set of directionally-adjustable sprinkler heads distributed about a periphery of said basin.

12. The mobile bird bath and sprinkler system of claim 8, further comprising:
a conduit coupled to said base and said basin, said conduit in fluid communication with said sprinkler head and operable to deliver a flow of water to said sprinkler head.

13. The mobile bird bath and sprinkler system of claim 12, further comprising:
a valve coupled to said conduit and operable to control the flow of water.

14. The mobile bird bath and sprinkler system of claim 8, wherein said base includes a storage compartment.

15. A mobile bird bath and sprinkler system, comprising:
a base having a longitudinal axis, a top at a first end of said longitudinal axis, and a bottom at a second end of said longitudinal axis;
a basin coupled to said top of said base;
a roller coupled to said bottom of said base;
a spike coupled to said bottom of said base wherein, when said longitudinal axis is perpendicular to a ground region, said roller rests on a surface of the ground region and said spike extends into the ground region;
a set of directionally-adjustable sprinkler heads distributed about a periphery of said basin, each of said sprinkler heads operable to distribute water over a selected portion the ground region and
a conduit passing through said base and in fluid communication with said sprinkler heads, said conduit operable to deliver a flow of water to said sprinkler heads.

16. The mobile bird bath and sprinkler system of claim 15, further comprising:
a handle attached to said basin.

17. The mobile bird bath and sprinkler system of claim 15, wherein said sprinkler heads include an oscillating sprinkler head.

18. The mobile bird bath and sprinkler system of claim 15, further comprising:

a valve coupled to said conduit and operable to control the flow of water.

19. The mobile bird bath and sprinkler system of claim 15, wherein said base includes a storage compartment.

* * * * *